United States Patent
Vucak et al.

(10) Patent No.: US 8,906,996 B2
(45) Date of Patent: Dec. 9, 2014

(54) SPHERICAL, AMORPHOUS CALCIUM CARBONATE PARTICLES

(75) Inventors: Marijan Vucak, Altendiez (DE); Christoph Nover, Rheinberg (DE)

(73) Assignee: Schaefer Kalk GmbH & Co. KG, Diez (DE)

( * ) Notice: Subject to any disclaimer, the term of this patent is extended or adjusted under 35 U.S.C. 154(b) by 0 days.

(21) Appl. No.: 13/811,664

(22) PCT Filed: Jul. 28, 2011

(86) PCT No.: PCT/EP2011/003792
§ 371 (c)(1),
(2), (4) Date: Apr. 9, 2013

(87) PCT Pub. No.: WO2012/013349
PCT Pub. Date: Feb. 2, 2012

(65) Prior Publication Data
US 2013/0190441 A1     Jul. 25, 2013

(30) Foreign Application Priority Data
Jul. 30, 2010   (EP) .................................... 10007959

(51) Int. Cl.
| | | |
|---|---|---|
| C08K 3/26 | (2006.01) | |
| B32B 5/16 | (2006.01) | |
| C09C 1/02 | (2006.01) | |
| D21H 17/67 | (2006.01) | |
| B82Y 30/00 | (2011.01) | |
| C01F 11/18 | (2006.01) | |
| D21H 17/69 | (2006.01) | |
| D21H 21/52 | (2006.01) | |
| D21H 19/38 | (2006.01) | |

(52) U.S. Cl.
CPC .............. C01F 11/183 (2013.01); C09C 1/021 (2013.01); *C01P 2004/62* (2013.01); *C01P 2006/82* (2013.01); D21H 17/69 (2013.01); *C01P 2004/32* (2013.01); C08K 3/26 (2013.01); D21H 21/52 (2013.01); D21H 19/385 (2013.01); *C01P 2004/64* (2013.01); D21H 17/675 (2013.01); *C01P 2004/61* (2013.01); *C01P 2002/02* (2013.01); *C01P 2006/12* (2013.01); *C01P 2002/70* (2013.01); B82Y 30/00 (2013.01); *C01P 2004/03* (2013.01)
USPC .......................................... 524/425; 428/402

(58) Field of Classification Search
CPC ............................. C04B 14/28; C01F 11/183
USPC ............................................................. 524/425
See application file for complete search history.

(56) References Cited

U.S. PATENT DOCUMENTS

2009/0198030 A1*  8/2009  Farge et al. ................... 526/240
2010/0035076 A1*  2/2010  Kostuch et al. ............. 428/537.5
2010/0048791 A1*  2/2010  Vucak et al. .................. 524/425

FOREIGN PATENT DOCUMENTS

EP           1151966 A1    11/2001
WO     WO-2008122358 A2    10/2008

OTHER PUBLICATIONS

Gorna et al., Materials Science and Engineering A, 477, 217-225, 2008.*
Faatz et al., Advanced Materials, 16 No. 12, 996-1000, 2004.*
Xu et al., Advanced Materials, 17, 2217-2221, 2005.*
Abdel-Aal et al., Journal of Crystal Growth, 256, 188-200, 2003.*
Abdel-Aal et al., "Inhibition of adhesion and precipitation of $CaCo_3$ by aminopolyphosphonate," *J. of Crystal Growth*, 256:188-200 (2003).
Pairat et al., "Precipitation and Dissolution of Calcium-ATMP Precipitates for the Inhibition of Scale Formation in Porous Media," *Langmuir*, 13:1791-1798 (1997).
Xu et al., "Stable Amorphous $CaCo_3$ Microparticles with hollow Spherical Superstructures Stabilized by Phytic Acid," *Adv. Mater.*, 17:2217-2221 (2005).
Römpp Chemie-Lexikon, pp. 1607-1608 and 4434-4440 (surface-active substances), 1997.
Römpp Chemie-Lexikon, pp. 3753-3754 (reduction), 1997.

* cited by examiner

*Primary Examiner* — Hui Chin
(74) *Attorney, Agent, or Firm* — Marshall, Gerstein & Borun LLP (57) ABSTRACT

Stabilized, spherical, amorphous calcium carbonate particles having a mean particle diameter in the range from 0.05 μm to 2.0 μm and a water content of at most 5.0 wt % measured as residual moisture at 200° C., wherein the calcium carbonate particles comprise at least one substance which has a molar mass greater than 100 g/mol and satisfies the formula $R—X_n$, wherein the radical R represents a radical comprising at least one carbon atom, the radical X represents a group which comprises at least one oxygen atom and at least one carbon atom, sulphur atom, phosphorus atom and/or nitrogen atom and n preferably constitutes a whole number in the range from 1 to 20, the proportion of crystalline calcium carbonate is less than 30 wt %, and the specific surface area of the calcium carbonate particles is at most 20 m²/g.

19 Claims, 8 Drawing Sheets

Fig. 8

SPHERICAL, AMORPHOUS CALCIUM CARBONATE PARTICLES

BACKGROUND OF THE INVENTION

1. Field of the Invention

The present invention relates to amorphous, spherical calcium carbonate particles, a production method thereof and use therefor.

2. Related Technology

Calcium carbonate, $CaCO_3$, is a calcium salt of carbonic acid, which today is used in many areas of daily life. For example, it serves particularly as an additive or modifier in paper, paints, plastics, inks, adhesives and pharmaceuticals. In plastics, calcium carbonate is used primarily as a functional filler agent, as a replacement for the relatively expensive polymer, to improve mechanical or optical properties and/or to make processing easier.

Calcium carbonate occurs naturally in various phases. In principle, a distinction is made between the hydrous and the anhydrous phases. Calcite, vaterite and aragonite are structures with no stored water content and have the same stoichiometry (polymorphism). Two hydrated crystalline phases of calcium carbonate also exist: the monohydrate and a hexahydrate (ikaite).

Besides the crystalline forms, amorphous calcium carbonate (ACC) is also known. ACC is a metastable phase that occurs with variable water content and in which the atoms do not form ordered structures but rather an irregular pattern, and so only have a short-range order, not a long-range order. ACC is unstable and transforms into calcite at temperatures above 300° C. This process is accelerated by the presence of water, and crystallization takes place at lower temperatures.

ACC can be prepared on the basis of many different starting materials and under many different reaction conditions, for example from a calcium chloride solution that is reacted with sodium bicarbonate in the presence of magnesium ions, with ammonium carbonate or sodium carbonate, or by hydrolysis of dimethyl carbonate in a calcium chloride solution.

The latter option is discussed notably in the dissertation by M. Faatz, *Kontrollierte Fällung von amorphem Calcium carbonate durch homogene Carbonatfreisetzung* Johannes Gutenberg-Universität Mainz 2005, in which two synthesis variants are examined in detail:

In the first variant, 0.001 mol calcium chloride in 100 ml aqueous solution is reacted with 0.001 mol dimethyl carbonate in the presence of 0.002 mol sodium hydroxide. Alternatively, 0.001 mol calcium chloride in 100 ml aqueous solution is caused to react with 0.005 mol dimethyl carbonate in the presence of 0.010 mol sodium hydroxide. The precipitates obtained in each case are isolated and dried, although more precise information regarding drying is not given. Both methods result in more or less spherical amorphous calcium carbonate particles with a residual stored water content of 0.4 mol to 0.6 mol relative to 1 mol calcium carbonate, or 7% by weight to 10% by weight water relative to total weight.

In the course of this work, the suitability of ACC for use as a filling material in ultrahigh molecular weight polyethylene (UHMW-PE) was also studied, and in this context the particles were dispersed in situ in the growing polymer chains to avoid chain scissions. The filled polymers obtained in this way have a melting peak in the range from 137° C. to 139° C., which is lower than that of the pure UHMW-PE (146° C.)

A refinement of these spherical amorphous calcium carbonate particles is described in patent application WO 2008/122358, which disclosed spherical calcium carbonate particles with an mean particle diameter in the range from 0.05 µm to 2.0 µm and a water content (residual moisture at 105° C.) not exceeding 5.0% by weight, relative to the total weight thereof, and an improved property spectrum.

The calcium carbonate particles are obtained in aqueous solution by reacting calcium chloride with dialkyl carbonate in the presence of an alkali metal hydroxide, wherein the components are advantageously used in the following concentrations:

a) $CaCl_2$: >10 mmol/l to 50 mmol/l;
b) Dialkyl carbonate: >10 mmol/l to 50 mmol/l;
c) Alkali metal hydroxide: 20 mmol/l to 100 mmol/l.

They are particularly suitable for use as additives or modifiers in paper, paints, plastics, inks, adhesives and pharmaceuticals.

However, the stability of the both the amorphous calcium carbonate particles obtained by Faatz and of the amorphous calcium carbonate particles of WO 2008/122358 is limited, since they are transformed into crystalline modifications over time. Accordingly, the stability of these particles in the reaction solution is of extremely short duration and is normally only in a range from a few minutes to a few hours. Therefore, in order to be able to use them as an additive or modifying agent, they must be processed further very quickly, which is very difficult to carry out, if not impossible, particularly on an industrial scale.

The stability of the isolated and dried calcium carbonate particles described by Faatz or in WO 2008/122358 is somewhat better, but it is still short-lived. From the technical point of view, therefore, calcium carbonate particles with improved long-term stability are desirable.

Furthermore, the known calcium carbonate particles have very high basicity, which makes them very difficult, if not impossible, to used in many fields of application.

In addition, from European patent application EP 1 151 966 A1 a method is known for producing stable, lamellar calcitic calcium carbonate with a granulometric factor of about 0.5 to 1 and an mean particle diameter of about 0.5 to 1.5 µm and comprising the following steps:

calcium hydroxide in aqueous suspension is converted to basic calcium carbonate by introducing $CO_2$ with an energy input of about 25 to 200 $kW/m^3$, one or more additives from the group consisting of organically substituted phosphonates, polycarboxylates or double-hydrophilic block copolymers in an amount of about 0.5 to 5% by weight relative to the calcium carbonate is/are stirred into the suspension as surfactants, additional $CO_2$ is introduced into the suspension relatively slowly besides the addition of the surfactants, and the calcitic calcium carbonate formed thereby is separated by filtration.

However, no reference is made to amorphous calcium carbonate in this document.

The publication by N. Abdel-Aal, K. Sawada *Inhibition of adhesion and precipitation of $CaCO_3$ by aminopolyphosphonate Journal of Crystal Growth* 256 (2003) 188-200, deals with the effect of ethylenediamine-N,N,N',N'-tetrakis-methylenephosphonic acid (EDTMP) on the formation and conversion processes of calcium carbonate that clings to the surface and was precipitated in solution. In this context, the effect of EDTMP on the quantity, speeds and adhesion times was investigated for various EDTMP concentrations. The effect on these reactions of the calcium concentration in the solution was also studied.

For this purpose, a predetermined quantity of a calcium chloride solution was added rapidly to a sodium carbonate solution, wherein the latter already contained a predetermined quantity of EDTMP. When the two solutions were mixed, a precipitate formed immediately in each case.

QCM sensors were immersed in the reaction solution and subsequently analyzed using scanning tunneling microscopy and X-ray diffraction. Under these circumstances, the lowest EDTMP concentration ($10^{-6}$ mol/l) yielded spherical calcite particles approximately 9 µm in size (FIG. 6). An EDTMP concentration of $10^{-5}$ mol/l yielded spherical calcite particles with a size of about 8 µm (FIG. 7). At the highest EDTMP concentration ($10^{-4}$ mol/l), the adhesion of calcium carbonate to the QCM sensors was severely inhibited and a small number of needle-shaped aragonite crystals and calcite particles were obtained on the QCM sensors (FIG. 8).

The publication assumes that at least intermediately amorphous calcium carbonate is formed during the reaction under study. This is assumed to have a very small particle size and a rough surface (page 197, right column, lines 9-13). However, it is not possible to deduce any more accurate information about the size and shape of the amorphous calcium carbonate from this document.

The publication by R. Pairat, C. Sumeath *Precipitation and Dissolution of Calcium—ATMP Precipitates for the Inhibition of Scale Formation in Porous Media* Langmuir 1997, 13, 1791-1798, examines the precipitation reaction of amino trimethylene phosphonic acid (ATMP) and calcium. Crystalline or lamellar calcium carbonate or powdery, spherical amorphous calcium carbonate is formed depending on the precipitation conditions.

The publication by An-Wu Xu, Qiu Yu, Wen-Fei Dong, Markus Antonietti, Helmut Cölfen *Stable Amorphous $CaCO_3$ Microparticles with Hollow Spherical Superstructures Stabilized by Phytic-Acid* Adv. Mater. 2005, 17, 2217-2221, describes the reaction of calcium chloride with ammonium carbonate in the presence of phytic acid. In this context, hollow calcium carbonate spheres with a size distribution in the range from 1 to 2.8 µm are formed from nanoscale amorphous calcium carbonate particles. The resulting hollow spheres are claimed to remain stable for longer than 14 days.

GENERAL DESCRIPTION OF THE INVENTION

Against this background, the object underlying the present invention was to describe options for obtaining amorphous calcium carbonate particles having improved properties. In particular, the calcium carbonate particles should have improved stability, preferably improved long-term stability, and should preferably be suitable as filler material for polymers, wherein in particular the mechanical properties of the polymers should be unimpaired as far as possible by the addition of the filling material, but should rather be further improved to the extent possible. In particular, calcium carbonate particles with a lower pH value should be provided, which are readily processable and are usable in the widest range of application areas possible. In addition, the calcium carbonate particles should be manufacturable as simply and inexpensively as possible, in a manner that is useful for large scale production.

By providing spherical amorphous calcium carbonate particles having a mean particle diameter in the range from 0.05 µm to 2.0 µm, and a structural water content less than 0.4 mol per mol calcium carbonate, it becomes possible in a manner not readily predictable to provide access to spherical amorphous calcium carbonate particles with enhanced properties profile and greater stability, particularly improved long-term stability. At the same time, these calcium carbonate particles are extremely stable and may be isolated and processed further relatively easily. They are particularly well suited for use as filling material for polymers, because it is extremely easy to disperse them in highly homogeneous manner in the polymer. The resulting polymer compounds are notable for their considerably improved property spectrum and in particular they have substantially improved mechanical properties, such as greater tensile strength, a higher tensile modulus and greater elongation at break as well as a considerably smoother surface. At the same time, because of the extremely low residual water content in the calcium carbonate particles according to the invention, they are very easily processable. The calcium carbonate particles according to the invention also feature relatively low basicity. The pH value thereof, appropriately measured according to EN ISO 787-9, is preferably below 11.5, more preferably below 11.0, particularly below 10.5. Consequently, the calcium carbonate particles according to the invention allow for relatively simple processing, which enables them to be used in an enormous range of fields, including fields that were previously not open to conventional calcium carbonate particles because of their high basicity.

The stabilized, spherical amorphous calcium carbonate particles according to claim 1 are particularly suitable for use as an intermediate product in the production of the calcium carbonate particles according to claim 10. The calcium carbonate particles according to claim 1 have a mean particle diameter in the range from 0.05 µm to 2.0 µm and a water content not exceeding 5.0% by weight relative to the total weight thereof and measured as residual moisture at 200° C. They comprise at least one substance that has a molar mass greater than 100 g/mol and has the formula R—$X_n$, wherein radical R stands for a radical having at least one carbon atom, radical X stands for a group that includes at least one oxygen atom and at least one carbon atom, sulphur atom, phosphorus atom and/or nitrogen atom, and n represents a number in the range from 1 to 20. In these particles, the fraction of crystalline calcium carbonate is less than 30% by weight relative to the total weight of the calcium carbonate. The specific surface area of these calcium carbonate particles is not greater than 20 $m^2$/g. These calcium carbonate particles too have an improved properties profile and greater stability, particularly improved long-term stability. In this context, they are particularly notable for their good stability in the mother liquor during synthesis, which lasts at least 100 minutes, preferably at least a day, particularly at least 5 days at a temperature in the range from 0° C. to 50° C., preferably in the range from 15° C. to 30° C. The dried calcium carbonate particles are also extremely stable and may be isolated and processed further relatively easily. These calcium carbonate particles are particularly well suited for use as filling material for polymers, because it is extremely easy to disperse them in highly homogeneous manner in the polymer. The resulting polymer compounds are notable for their considerably improved property spectrum and in particular they have substantially improved mechanical properties, such as greater tensile strength, a higher tensile modulus and greater elongation at break as well as a considerably smoother surface. At the same time, because of the extremely low residual water content in the calcium carbonate particles according to the invention, they are very easily processable. The calcium carbonate particles according to the invention also feature relatively low basicity. The pH value thereof, appropriately measured according to EN ISO 787-9, is preferably below 11.5, more preferably below 11.0, particularly below 10.5. Consequently, the calcium carbonate particles according to the invention allow for relatively simple processing, which enables them to be used in an enormous range of fields, including fields that were previously not open to conventional calcium carbonate particles because of their high basicity.

According to an first aspect of the present invention, the present invention relates to spherical, amorphous calcium carbonate particles that have a structural water content less than 0.4 mol, preferably less than 0.3 mol, particularly preferably less than 0.2 mol, most particularly preferably less than 0.1 mol, per mole of calcium carbonate. Within the terms of the present invention, these calcium carbonate particles are occasionally referred to as "calcium carbonate particles with low structural water content". In a particularly preferred embodiment of the present invention, these calcium carbonate particles contain no structural water.

According to a further aspect, the present invention relates to spherical, amorphous calcium carbonate particles that are stabilized with a substance and are particularly suitable for producing the "calcium carbonate particles with low structural water content". Within the terms of the present invention, these calcium carbonate particles are occasionally referred to as "stabilized calcium carbonate particles".

Unless otherwise indicated, the following notes regarding the calcium carbonate particles apply for both the "calcium carbonate particles with low structural water content" and the "stabilized calcium carbonate particles".

The present invention relates to spherical calcium carbonate particles. Unlike the other known forms of the related art, the spherical calcium carbonate particles of the present invention are not formed for example from needles, rhombohedra, scalenohedra or somatoids (precipitated calcium carbonate; PCC) or from irregularly shaped particles (ground calcium carbonate; GCC), but from spherical particles that preferably exist for the most part as monocomponents. However, minor departures from the perfect spherical shape are acceptable as long as the properties of the particles, particularly their dispersibility, are not fundamentally altered. Thus the surface of the particles may exhibit occasional flaws or additional deposits.

The calcium carbonate spheres according to the invention are preferably solid spheres that consist entirely of amorphous calcium carbonate, not only on the surface thereof. Ideally, as far as possible they have a homogeneous structure and density.

Compared with the known calcium carbonate particles, the calcium carbonate particles according to the present invention are characterized by very good dispersibility. They are most suitable for use as filler for polymers, because they are extremely easy to disperse throughout the polymer in thoroughly homogeneous manner. At the same time, the relatively high incidence of monocomponent calcium carbonate particles according to the invention and their relatively low agglomeration enables exceptionally even distribution of the calcium carbonate particles inside the sample, particularly in a polymer.

The mean diameter of the calcium carbonate particles according to the invention is 0.05 μm to 2.0 μm. And the mean particle diameter is preferably smaller than 1.75 μm, particularly preferably smaller than 1.5 μm, especially smaller than 1.2 μm. Additionally, the mean particle diameter is advantageously larger than 0.1 μm, preferably larger than 0.2 μm, particularly larger than 0.3 μm. It is ideally determined by analysis of scanning electron microscope (SEM) imagery, in which case preferably only particles with a size of at least 0.01 μm are taken into account, and a number average is derived on the basis of preferably at least 20, particularly preferably at least 40 particles. Sedimentation analysis methods have also proven highly effective, particularly when a Sedigraph 5100 (Micromeritics GmbH) is used.

The spread of the particle size distribution is quite narrow, and preferably of such a nature that at least 90.0% by weight of all calcium carbonate particles have a particle diameter in the range from mean particle diameter −30% to mean particle diameter +30%.

The aspect ratio of the calcium carbonate particle, for the present purposes defined as the quotient of the minimum particle diameter and the maximum particle diameter, is greater than 0.90, particularly preferably greater than 0.95 advantageously for at least 90%, ideally for at least 95% of all particles. In this context, preferably only particle with a particle size in the range from 0.1 μm to 2.0 μm are considered.

The calcium carbonate particles according to the invention, particularly the "stabilized calcium carbonate particles", also feature a relatively low water content. Relative to their total weight, they have a water content (residual moisture at 200° C.) of not more than 5.0% by weight, preferably not more than 2.5% by weight, more preferably not more than 1.0% by weight, particularly preferably not more than 0.5% by weight, still more preferably less than 0.4% by weight, advantageously less than 0.3% by weight, ideally less than 0.2% by weight, particularly not more than 0.1% by weight.

Within the terms of the present invention, the water content of the calcium carbonate particles is determined using thermal gravimetric analysis, wherein the measurement is preferably carried out in nitrogen (nitrogen flow rate preferably 20 ml/min) and advantageously over the temperature range from 40° C. or lower to 250° C. or higher. The measurement is also taken preferably with a heating rate of 10° C./min.

The "stabilized calcium carbonate particles", also have a low structural water content. This is preferably lower than 5 mol, more preferably lower than 3 mol, particularly preferably lower than 1 mol, especially lower than 0.5 mol structural water per mole calcium carbonate. In a most particularly preferred embodiment of the present invention, the calcium carbonate particles contain no structural water.

The calcium carbonate particles according to the invention are also characterized by a relatively narrow particle size distribution and a very smooth surface.

The specific surface area (BET) of the "calcium carbonate particles with low structural water content" is preferably not more than 20 $m^2/g$, more preferably not more than 18 $m^2/g$, advantageously not more than 16 $m^2/g$, particularly preferably not more than 14 $m^2/g$, most particularly preferably not more than 12 $m^2/g$, especially not more than 10 $m^2/g$. Within the terms of a particularly preferred variant of the present invention, it is not more than 8 $m^2/g$, preferably not more than 7 $m^2/g$, favorably not more than 6 $m^2/g$, particularly preferably not more than 5 $m^2/g$, especially not more than 4 $m^2/g$. On the other hand, it is preferably at least 1 $m^2/g$, more preferably at least 2 $m^2/g$, particularly at least 3 $m^2/g$. It is particularly advantageously in the range from 2 $m^2/g$ to 20 $m^2/g$, especially in the range from 4 $m^2/g$ to 12 $m^2/g$.

The specific surface area of the "stabilized calcium carbonate particles" is not more than 20 $m^2/g$, preferably not more than 18 $m^2/g$, advantageously not more than 16 $m^2/g$, particularly preferably not more than 14 $m^2/g$, especially preferably not more than 12 $m^2/g$, most preferably not more than 10 $m^2/g$. Within the terms of a particularly preferred variant of the present invention, it is not more than 8 $m^2/g$, preferably not more than 7 $m^2/g$, advantageously not more than 6 $m^2/g$, especially preferably not more than 5 $m^2/g$, most particularly not more than 4 $m^2/g$. On the other hand, it is preferably at least 1 $m^2/g$, more preferably at least 2 $m^2/g$, particularly at least 3 m²/g. Most advantageously, it is in the range from 2 m²/g to 20 m²/g, particularly in the range from 4 m²/g to 12 m²/g.

In this context, one property of the calcium carbonate particles according to the invention that is particularly noteworthy is that the specific surface area thereof remains relatively constant during drying, and varies preferably by not more than 200%, more preferably not more than 150%, particularly not more than 100%, relative to the initial value in each case.

Within the terms of the present invention, the calcium carbonate particles are substantially amorphous. In this context, the term "amorphous" describes those calcium carbonate modifications in which at least some of the atoms do not have ordered structures, but rather form an irregular pattern and accordingly only possess short-range order, but not long-range order. This represents an important distinction between the amorphous form and crystalline modifications of calcium carbonate, such as calcite, vaterite and aragonite, in which the atoms possess both short-range and long-range order.

In the present instance, however, the presence of crystalline components is not categorically precluded. However, the fraction of crystalline calcium carbonate if preferably less than 50% by weight, particularly preferably less than 30% by weight, especially preferably less than 15% by weight, most particularly less than 10% by weight. Within the terms of a particularly preferred variant of the present invention, the fraction of crystalline calcium carbonate is less than 8.0% by weight, preferably less than 6.0% by weight, advantageously less than 4.0% by weight, particularly preferably less than 2.0% by weight, especially preferably less than 1.0% by weight, most preferably less than 0.5% by weight, relative to the total weight of the calcium carbonate in each case.

In the "stabilized calcium carbonate particles" according to the invention, it is essential for the fraction of crystalline calcium carbonate to be less than 30% by weight, preferably less than 15% by weight, particularly less than 10% by weight, relative to the total weight of the calcium carbonate in each case. Within the terms of a particularly preferred variant of the present invention, the fraction of crystalline calcium carbonate is less than 8.0% by weight, preferably less than 6.0% by weight, advantageously less than 4.0% by weight, particularly preferably less than 2.0% by weight, especially preferably less than 1.0% by weight, most preferably less than 0.5% by weight, relative to the total weight of the calcium carbonate in each case.

X-ray diffraction with an internal standard, preferably quartz, in conjunction with a Rietveld refinement has proven to be most particularly effective for the purpose of determining the amorphous and crystalline fractions.

Within the terms of the present invention, the "stabilized calcium carbonate particles" are stabilized by at least one preferably surface active substance, which is preferably disposed on the surface of the spherical calcium carbonate particles. For the purposes of the present invention "surface-active substances" advantageously describe organic compounds that accumulate significantly on boundary surfaces (water/calcium carbonate particles) from the solution thereof, resulting in a lowering of the surface tension, preferably measured at 25° C. For further details, reference is herewith made to the technical literature, particularly Römpp-Lexikon Chemie/Published by Jürgen Falbe; Manfred Regitz. Edited by Eckard Amelingmeier; Stuttgart, New York; Thieme; Volume 2: Cm-G; 10$^{th}$ edition (1997); Keyword: "Surface-active substances".

According to the invention, the preferably surface-active substance has a molar mass greater than 100 g/mol, preferably greater than 125 g/mol, particularly greater than 150 g/mol and has the formula R—$X_n$.

In this context, radical R stands for a radical containing at least 1, preferably at least 2, more preferably at least 4, particularly preferably at least 6, especially at least 8 carbon atoms, which is preferably an aliphatic or cycloaliphatic radical, and may optionally contain additional radicals X, and which may or may not include one or more ether compounds.

Radical X stands for a group containing at least one oxygen atom and at least one carbon atom, sulphur atom, phosphorus atom and/or nitrogen atom, preferably at least one phosphorus atom and/or at least one carbon atom. The following groups are particularly preferred:

Carboxylic acid groups ~COOH,
Carboxylate groups ~COO$^-$,
Sulphonic acid groups ~SO$_3$H,
Sulphonate groups ~SO$_3^-$,
Bisulphate groups ~OSO$_3$H,
Sulphate groups ~OSO$_3^-$,
Phosphonic acid groups ~PO$_3$H$_2$,
Phosphonate groups ~PO$_3$H$^-$, ~PO$_3^{2-}$,
Amino groups ~NR$^1$R$^2$ and
Ammonium groups ~N$^+$R$^1$R$^2$R$^3$, particularly carboxylic acid groups, carboxylate groups, phosphonic acid groups and phosphonate groups.

In this context, radicals R$^1$, R$^2$ and R$^3$ independently stand for hydrogen or an alkyl group having 1 to 5 carbon atoms. One of the radicals R$^1$, R$^2$ and R$^3$ may also be a radical R.

Preferred counterions for the anions listed in the preceding are metal cations, particularly alkali metal cations, preferably Na$^+$ and K$^+$, and ammonium ions.

Preferred counterions for the cations listed in the preceding are hydroxyl ions, bicarbonate ions, carbonate ions, bisulphate ions, sulphate ions and halide ions, particularly chloride and bromide ions.

n stands for a number, preferably a whole number, in the range from 1 to 20, more preferably in the range from 1 to 10, particularly in the range from 1 to 5.

Substances that are particularly suitable for the purposes of the present invention include alkylcarboxylic acids, alkylcarboxylates, alkylsulphonic acids, alkylsulphonates, alkylsulphates, alkylether sulphates preferably having 1 to 4 ethylene glycol ether units, fatty alcohol ethoxylates preferably having 2 to 20 ethylene glycol ether units, alkylphenol ethoxylates, substituted or unsubstituted alkylphosphonic acids, substituted or unsubstituted alkylphosphonic acids, substituted or unsubstituted alkylphosphonates, sorbitan fatty acid esters, alkyl polyglucosides, N-methylglucamides, homo- and copolymers of acrylic acid and the corresponding salt forms and block copolymers thereof.

A first group of most particularly suitable substances are substituted or unsubstituted alkylphosphonic acids, particularly amino-tri-(methylenephosphonic acid), 1-hydroxyethylene-(1,1-diphosphonic acid), ethylenediamine-tetra-(methylenephosphonic acid), hexamethylene diamine-tetra-(methylenephosphonic acid), diethylenetriamine-penta-(methylenephosphonic acid), and substituted or unsubstituted alkyl phosphonates, particularly of the acids listed in the preceding. These compounds are known as multifunctional sequestering agents for metal ions and scale inhibitors.

Homo- and copolymers, preferably homopolymers of acrylic acid and the corresponding salt forms thereof have also proven particularly effective, particularly those that have a weight average molecular weight in the range from 1,000 g/mol-10,000 g/mol.

The use of block copolymers, preferably double hydrophilic block copolymers, particularly of polyethylene oxide or polypropylene oxide, are also particularly effective.

In principle, the fraction of the preferably surface-active substances may be chosen freely and adjusted specifically for the application in question. However, it is preferably in the range from 0.1% by weight to 5.0% by weight, particularly in the range from 0.3% by weight to 1.0% by weight, relative to the $CaCO_3$ content of the spherical calcium carbonate particles.

The spherical, amorphous calcium carbonate particles may be produced in a manner known per se, for example by hydrolysing dialkyl carbonate or alkylene carbonate in a solution containing calcium cations.

The preparation of unsterilized, spherical calcium carbonate particles is described in detail for example in patent application WO 2008/122358, the disclosure of which, particularly as it relates to pertinent variants of the preparation of such unsterilized spherical calcium carbonate particles, is herewith explicitly included in the present application by reference.

The hydrolysis of the dialkyl carbonate or alkylene carbonate is expediently conducted in the presence of a hydroxide.

Preferred substances for the purposes of the present invention that include $Ca^{2+}$ ions are calcium halides, preferably $CaCl_2$, $CaBr_2$, particularly $CaCl_2$, and calcium hydroxide. Within the terms of a first particularly preferred embodiment of the present invention, $CaCl_2$ is used. In another particularly preferred embodiment of the present invention, $Ca(OH)_2$ is used.

Within the terms of a first particularly preferred embodiment of the present invention, a dialkyl carbonate is used. Particularly suitable dialkyl carbonates contain 3 to 20, preferably 3 to 9, carbon atoms, particularly dimethyl carbonate, diethyl carbonate, di-n-propylcarbonate, di-iso-propylcarbonate, di-n-butylcarbonate, di-sec-butylcarbonate and di-tert.-butylcarbonate, wherein dimethylcarbonate is most particularly preferred in this context.

In another particularly preferred embodiment of the present invention, an alkylene carbonate is brought to reaction. Particularly effective alkylene carbonates contain 3 to 20, preferably 3 to 9, particularly preferably 3 to 6 carbon atoms and particularly include those compounds that include a ring of 3 to 8, preferably 4 to 6, particularly 5 atoms, with preferably 2 oxygen atoms and otherwise carbon atoms. Propylene carbonate (4-methyl-1,3-dioxolane) has proven most effective in this context.

Alkali metal hydroxides, particularly NaOH and calcium hydroxide have proven to be particularly suitable for use as the hydroxide. Within the terms of a first particularly preferred embodiment of the present invention, NaOH is used. In another particularly preferred embodiment of the present invention, $Ca(OH)_2$ is used.

Furthermore, the molar ratio of $Ca^{2+}$, preferably calcium chloride, to $OH^-$, preferably alkali metal hydroxide, in the reaction mixture is preferably greater than 0.5:1 and particularly preferably in the range from >0.5:1 to 1:1, particularly in the range from 0.6:1 to 0.9:1.

The molar ratio of $Ca^{2+}$, preferably calcium chloride, to dialkyl carbonate and/or alkylene carbonate in the reaction mixture is expediently in the range from 0.9:1.5 to 1.1:1, particularly preferably in the range from 0.95:1 to 1:0.95. Within the terms of an especially expedient variant of the present invention, the dialkyl carbonate and/or alkylene carbonate and the $Ca^{2+}$, particularly calcium chloride, are used in equimolar proportions.

Within the terms of a first especially preferred embodiment of the present invention, $Ca(OH)_2$ is not used as the $OH^-$ source. In this context, the components for the reaction are expediently used in the following concentrations:

a) $Ca^{2+}$: >10 mmol/l to 50 mmol/l, preferably 15 mmol/l to 45 mmol/l, particularly 17 mmol/l to 35 mmol/l;
b) Dialkyl carbonate and/or
    alkylene carbonate: >10 mmol/l to 50 mmol/l, preferably 15 mmol/l to 45 mmol/l, particularly 17 mmol/l to 35 mmol/l;
c) $OH^-$: 20 mmol/l to 100 mmol/l, preferably 20 mmol/l to 50 mmol/l, particularly preferably 25 mmol/l to 45 mmol/l, especially 28 mmol/l to 35 mmol/l.

The concentrations stated refer to the respective concentrations of the named components in the reaction mixture.

Within the terms of another especially preferred embodiment of the present invention, $Ca(OH)_2$, preferably limewash, particularly saturated limewash, is used as the $OH^-$ source. The components for the reaction are expediently used in the following concentrations:

a) $Ca(OH)_2$: >5 mmol/l to 25 mmol/l, preferably 7.5 mmol/l to 22.5 mmol/l, particularly 8.5 mmol/l to 15.5 mmol/l;
b) Dialkyl carbonate and/or
    alkylene carbonate: >5 mmol/l to 25 mmol/l, preferably 7.5 mmol/l to 22.5 mmol/l, particularly 8.5 mmol/l to 15.5 mmol/l.

The concentrations stated refer to the respective concentrations of the named components in the reaction mixture.

The components are preferably reacted at a temperature in the range from 15° C. to 30° C.

The specific size of the calcium carbonate particles can be controlled in a manner known per se by supersaturation.

The calcium carbonate particles are precipitated from the reaction mixture under the conditions described above.

The amorphous calcium carbonate particles are stabilized expediently by adding the preferably surface-active substance to the reaction mixture.

This addition of the substance should not be carried out until after the reaction for forming the calcium carbonate particles has begun, that is to say after the reactants have been added, preferably at least 1 minute, more preferably at least 2 minutes, expediently at least 3 minutes, particularly preferably at least 4 minutes, most preferably at least 5 minutes after the reactants are mixed. Furthermore, the point in time when the addition is made must be chosen such that the preferably surface-active substance is added shortly before the end of the precipitation and as late as possible before the amorphous calcium carbonate begins changing into crystalline modifications, since this enables the yield and purity of the "stabilized, spherical amorphous calcium carbonate particles" to be maximized. If the preferably surface-active substance is added earlier, the result is usually a bimodal product that includes ultrafine amorphous calcium carbonate particles as a byproduct in addition to the desired, stabilized, spherical amorphous calcium carbonate particles. If the preferably surface-active substance is added later, the transformation of the desired "stabilized calcium carbonate particles" into crystalline modifications will have already begun.

This is why the preferably surface-active substance is preferably added at a pH value equal to or lower than 11.5, preferably lower than 11.3, particularly lower than 11.0. It is particularly favorable to add the substance when the pH value is in a range from 11.5 to 10.0, more preferably in a range from 11.3 to 10.5, particularly in a range from 11.0 to 10.8, measured at the reaction temperature, preferably 25° C., in each case.

The resulting "stabilized calcium carbonate particles" may be dehydrated and dried in a manner known per se, for example by centrifuging. It is no longer absolutely necessary to wash with acetone and/or dry in a vacuum drying chamber.

The "calcium carbonate particles with low structural water content" according to the invention may be obtained from the "stabilized calcium carbonate particles" according to the invention by drying.

For the purposes of the present invention, the calcium carbonate particles thus obtained are dried in a manner such that they exhibit the desired residual water content. For this purpose, a drying method in which the calcium carbonate particles are dried first at a temperature up to 150° C. and then preferably at a temperature in the range from above 150° C. to 250° C., more preferably in the range from 170° C. to 230° C., particularly preferably in the range from 180° C. to 220° C., particularly in the range from 190° C. to 210° C. has proven particularly effective. The drying preferably takes place in a circulating air drying chamber. The calcium carbonate particles are expediently dried for at least 3 h, particularly preferably at least 6 h, in particular at least 20 h.

After drying, the dried products are expediently reduced, preferably ground, particularly preferably extremely finely ground, particularly colloidally ground in order to separate the individual particles from each other as effectively as possible. This may be done in a manner known per se, for example using a mill, particularly a pin-type mill, which grinds material preferably to an ultimate fineness smaller than 1000 μm, more preferably smaller than 10 μm, particularly smaller than 5 μm. Further information regarding the reduction of products may be found in the standard technical literature, particularly Römpp-Lexikon Chemie, Published by Jürgen Falbe, Manfred Regitz Stuttgart, New York, Thieme 10$^{th}$ Edition, Volume: M-Pk, keywords "Grinding" and "Mills" and Volume T-Z, keyword "Reducing" and the sources cited in those articles.

In principle, the calcium carbonate particles according to the invention, particularly the "calcium carbonate particles with low structural water content", are suitable for use in all applications for which calcium carbonate is normally considered. These include in particular their use as an additive or modifier in paper, paints, plastics, inks, adhesives and pharmaceuticals, particularly as filler in organic polymers.

Particularly useful polymer compounds contain 99.9% by volume to 50.0% by volume, particularly preferably 95.0% by volume to 50.0% by volume of at least one polymer and 0.1% by volume to 50.0% by volume, particularly preferably 5.0% by volume to 50% by volume spherical, amorphous calcium carbonate particles, particularly "calcium carbonate particles with low structural water content", relative to the total volume thereof in each case. Polymers that are thermoplastically processable, preferably polymers that are thermoplastically processable at temperatures in the range from 100° C. to 350° C., particularly in the range from 100° C. to 250° C., particularly polyethylene, such as LLDPE, HDPE, polypropylene (PP), polystyrene (PS) and polylactic acid (PLA) as well as other resorbable polymers, particularly bioresorbable polymers, are particularly preferred in this context.

Most particularly advantageous is the use of the amorphous calcium carbonate particles according to the invention, particularly the "calcium carbonate particles with low structural water content", as a component in manufacturing polymer compounds, preferably resorbable polymer compounds, particularly bioresorbable polymer compounds.

The incorporation of the filler into the polymer can take place in a manner known per se, for example by thermoplastic processing. Particularly preferred methods for producing the polymer compounds according to the invention include kneading, rolling, calendaring, extruding and/or injection moulding of compounds that preferably include the polymer and the calcium carbonate particles according to the invention. Extrusion methods having proven most particularly effective in this context.

DETAILED DESCRIPTION

In the following, the teaching of the present invention will be explained in greater detail with reference to examples and comparison examples thereof, which shall not be interpreted as limiting of the inventive thought in any way.

Characterization

The properties of the calcium carbonate particles and of the polymer compound were determined as follows.

Electron Microscope

The scanning electron images were produced with a high-voltage electron microscope (Zeiss, DSM 962) at 15 kV. The samples were sprayed with a gold-palladium layer.

X-Ray Scattering

The amorphous and crystalline fractions were determined using by X-ray scattering with an internal standard (aluminum oxide, −100 mesh) in conjunction with the Rietveld refinement.

Thermal Gravimetric Analysis (TGA)

Thermal gravimetric analysis was carried out using a PerkinElmer STA 6000 in nitrogen (nitrogen flow rate: 20 ml/min) in the range from 40° C. to 1000° C. with a heating rate of 10° C./min.

Specific Surface Area (BET)

The specific surface area of the particles was carried out using the BET method (Micromeritics Gemini 2360 Analyzer) by nitrogen adsorption. The samples were degassed for the adsorption investigations at room temperature overnight (FlowPrep 060 Degasser).

pH Value of Power Samples

The pH value of powder samples was determined in accordance with EN ISO 787-9. 1.5 g powder in 13.5 g $CO_2$-free deionized water was added at the DACC.

Comparison Example 1

Alkaline ACC (Based on Faatz' Doctoral Thesis)

5 l deionized water was prepared in a 5 l plastic canister, and 14.702 g (0.02 mol/l relating to solution A) calcium chloride dihydrate and 45.000 g (0.1 mol/l relating to solution A) dimethyl carbonate were dissolved in the water at 23.5° C. (solution A). A solution of 39.978 g (0.2 mol/l relating to solution B) sodium hydroxide in 5 l deionized water was prepared in a separate 5 l plastic canister at 23.5° C. (solution B).

1000 ml thoroughly homogenized solution A was prepared in a 2000 ml PE wide-necked flask. Then, 1000 ml solution B was added quickly to solution A, the stopwatch was started and the reaction mixture was shaken 20 times (about 10 s).

The reaction solution became cloudy after 1 min.

After 3.5 min, the precipitate was separated from the mother liquor by filtration, washed thoroughly with acetone, and the precipitate was dried in a vacuum.

The specific surface area of the particles was 4.4 $m^2$/g and the pH value of the powder was 12.4.

1.43 g reaction product was recovered.

Figure 1:
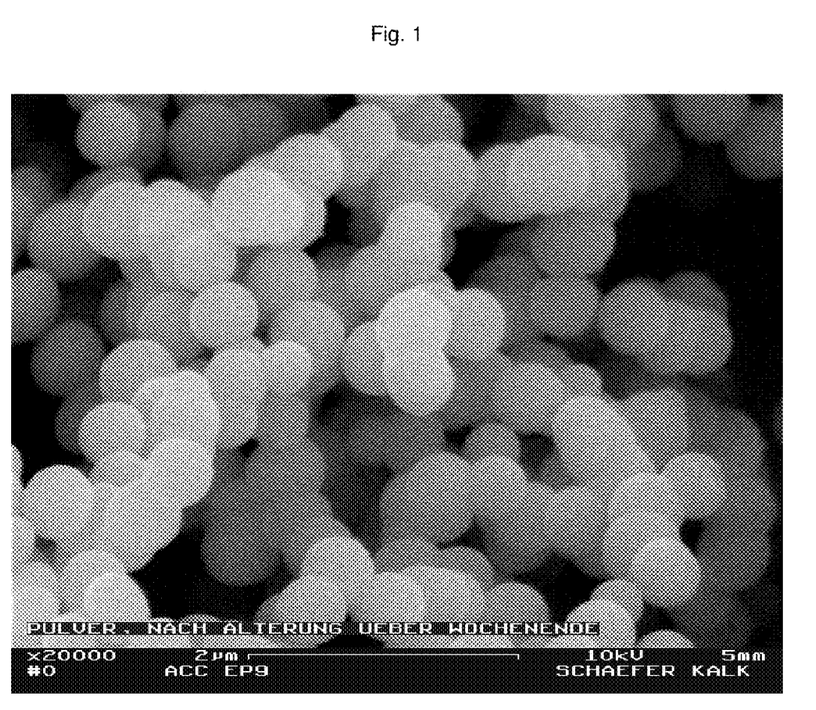
FIG. 1 shows an electron microscope image of the product of Comparison Example 1 after storing at 23° C. and in relative humidity of 65% for six days.

An electron microscope image of the product taken after storing at 23° C. and in relative humidity of 65% for 6 days is shown in FIG. 1.

Figure 2:
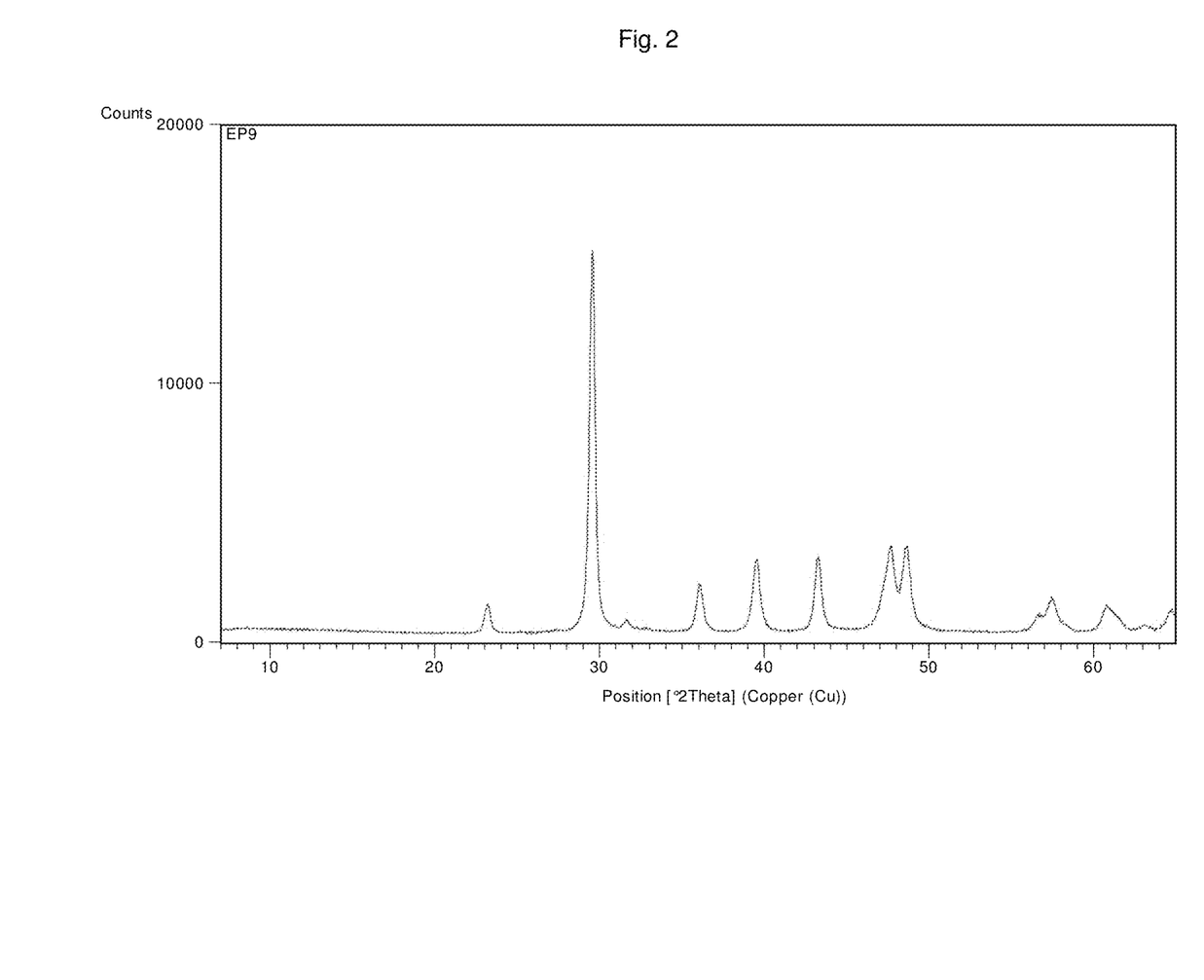
FIG. 2 shows the X-ray diffraction spectrum of the product of Comparison Example 1. The calcium carbonate particles comprised essentially crystalline fractions.

FIG. 2 shows the X-ray diffraction spectrum of this product. The calcium carbonate particles comprised essentially crystalline fractions.

When the calcium carbonate particles were aged in the mother liquor, the components were observed to be mainly crystalline after just 100 minutes.

Comparison Example 2

ACC (Based on Faatz' Doctoral Thesis)

5 l deionized water was prepared in a 5 l plastic canister, and 14.702 g (0.02 mol/l relating to solution A) calcium chloride dihydrate and 9.000 g (0.02 mol/l for relating to solution A) dimethyl carbonate were dissolved in the water at 23.5° C. (solution A). A solution of 7.996 g (0.04 mol/l relating to solution B) sodium hydroxide in 5 l deionized water was prepared in a separate 5 l plastic canister at 23.5° C. (solution B).

1000 ml thoroughly homogenized solution A was prepared in a 2000 ml PE wide-necked flask. 1000 ml solution B was then added rapidly to solution A, the stopwatch was started, the reaction mixture was shaken 20 times (approx. 10 s).

The reaction solution became cloudy after 7 min.

After 10 min, the precipitate was separated from the mother liquor by filtration, washed thoroughly with acetone, and the precipitate was dried in a vacuum.

The specific surface area of the particles was 6.2 $m^2$/g.

0.35 g reaction product was recovered.

Figure 3:
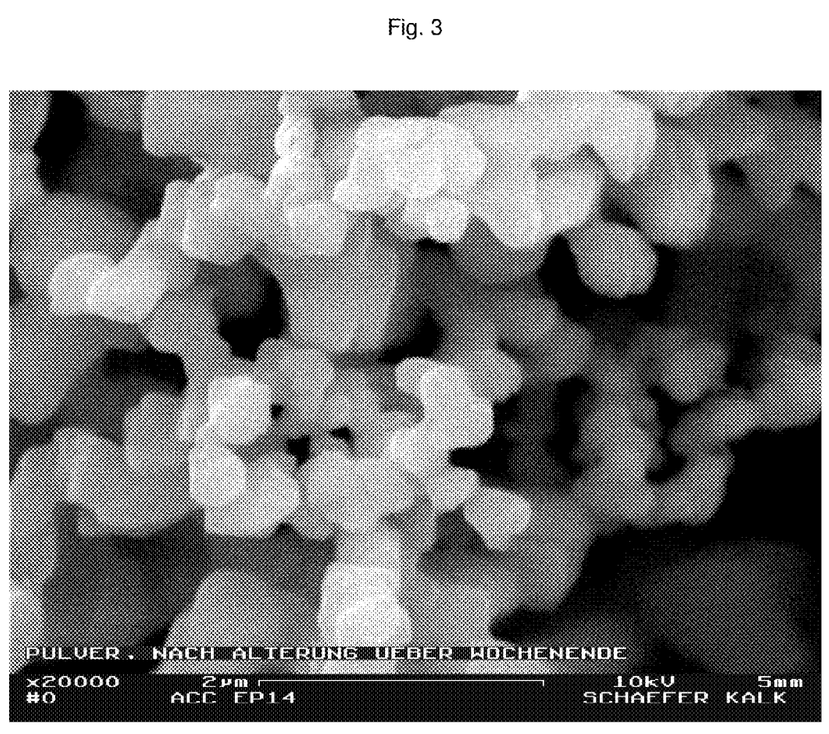
FIG. 3 shows an electron microscope image of the product of Comparison Example 2 after storing at 23° C. and in relative humidity of 65% for six days.

An electron microscope image of the product taken after storing at 23° C. and in relative humidity of 65% for 6 days is shown in FIG. 3.

Figure 4:
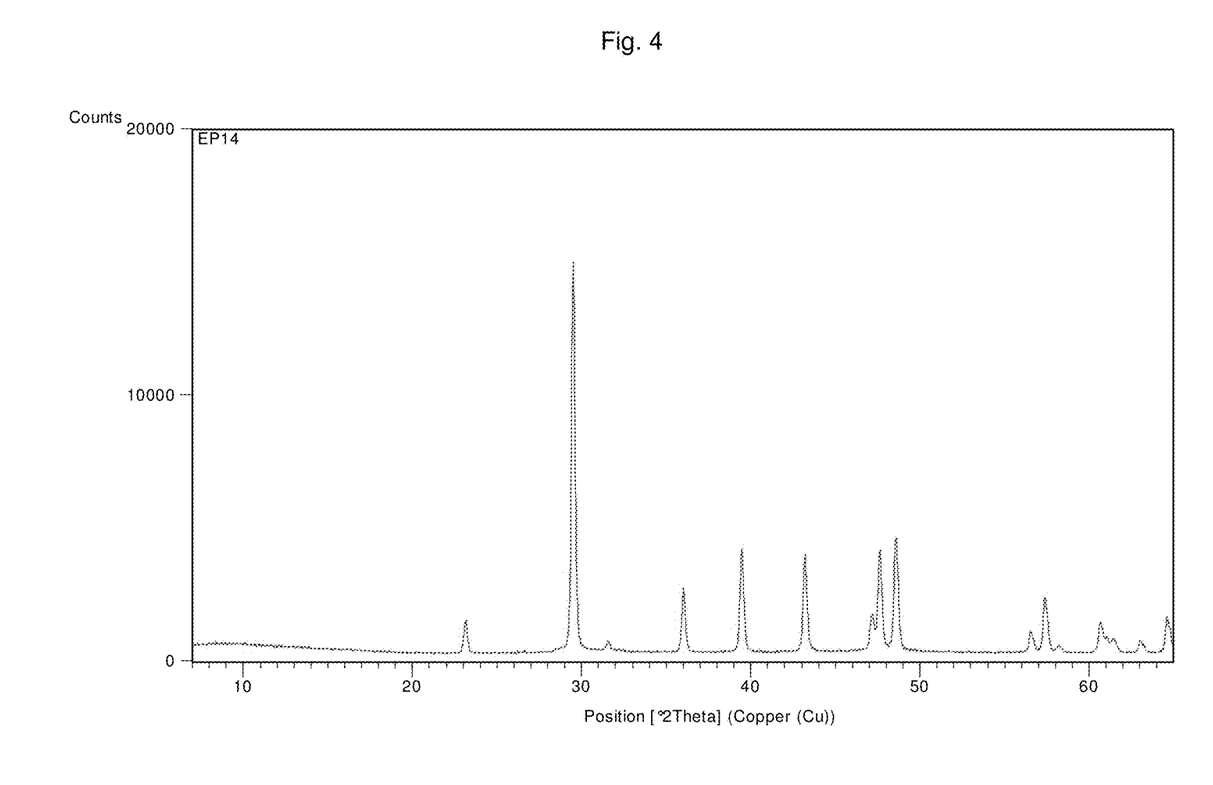
FIG. 4 shows the X-ray diffraction spectrum of the product of Comparison Example 2. The calcium carbonate particles comprised essentially crystalline fractions.

FIG. 4 shows the X-ray diffraction spectrum of this product. The calcium carbonate particles comprised essentially crystalline fractions.

When the calcium carbonate particles were aged in the mother liquor, the components were observed to be mainly crystalline after just 100 minutes.

Comparison Example 3

Dried ACC (Acc. To WO 2008/122358: Example B2 (Table 1) and V16 (Table 2))

5 l deionized water was prepared in a 5 l plastic canister, and 29.404 g (0.04 mol/l relating to solution A) calcium chloride dihydrate and 18.016 g (0.04 mol/l relating to solution A) dimethyl carbonate were dissolved in the water at 23.5° C. (solution A). A solution of 12.000 g (0.06 mol/l relating to solution B) sodium hydroxide in 5 l deionized water was prepared in a separate 5 l plastic canister at 23.5° C. (solution B).

1000 ml thoroughly homogenized solution A was prepared in a 2000 ml PE wide-necked flask. 1000 ml solution B was then added rapidly to solution A, the stopwatch was started, the reaction mixture was shaken 20 times (approx. 10 s).

The reaction solution became cloudy after 4 min.

After 10 min, the precipitate was separated from the mother liquor by filtration, washed thoroughly with acetone, and the precipitate was dried in a vacuum, first at room temperature (V1) and then in a vacuum at 200° C. for 6 h (V16). According to TGA (temperature range from 40-250° C.), the water content after this drying process at 200° C. was approximately 0.4% by weight.

The specific surface area of particles V1 was 3.4 $m^2$/g. The specific surface area of particles V16 was 6.0 $m^2$/g and the pH value was 11.9.

After drying in a vacuum at room temperature (V1), 1.43 g reaction product was recovered.

Figure 5:
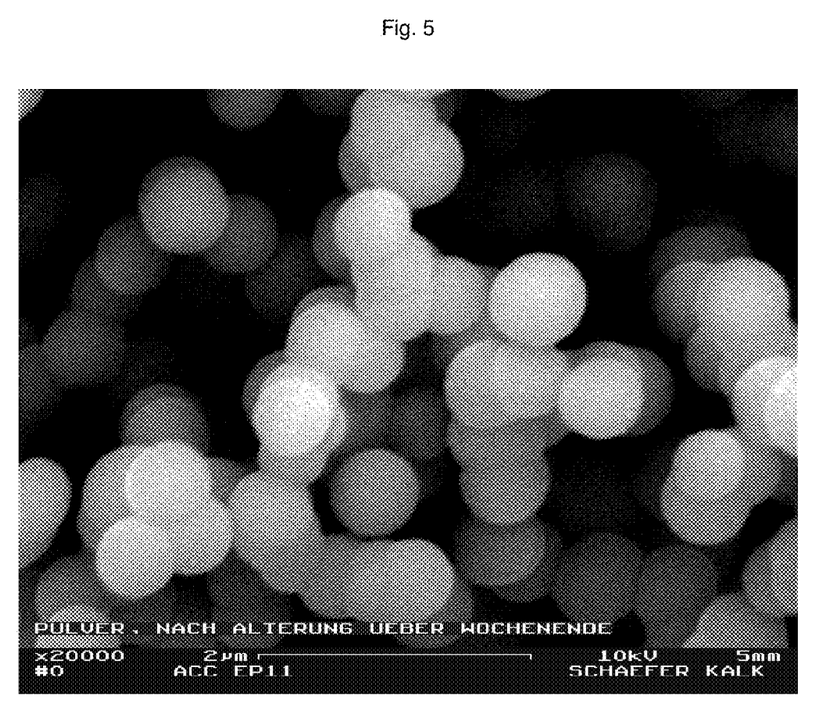
FIG. 5 shows an electron microscope image of the product of Comparison Example 3 after storing at 23° C. and in relative humidity of 65% for six days.

An electron microscope image of the product taken after storing at 23° C. and in relative humidity of 65% for 6 days is shown in FIG. 5.

Figure 6:
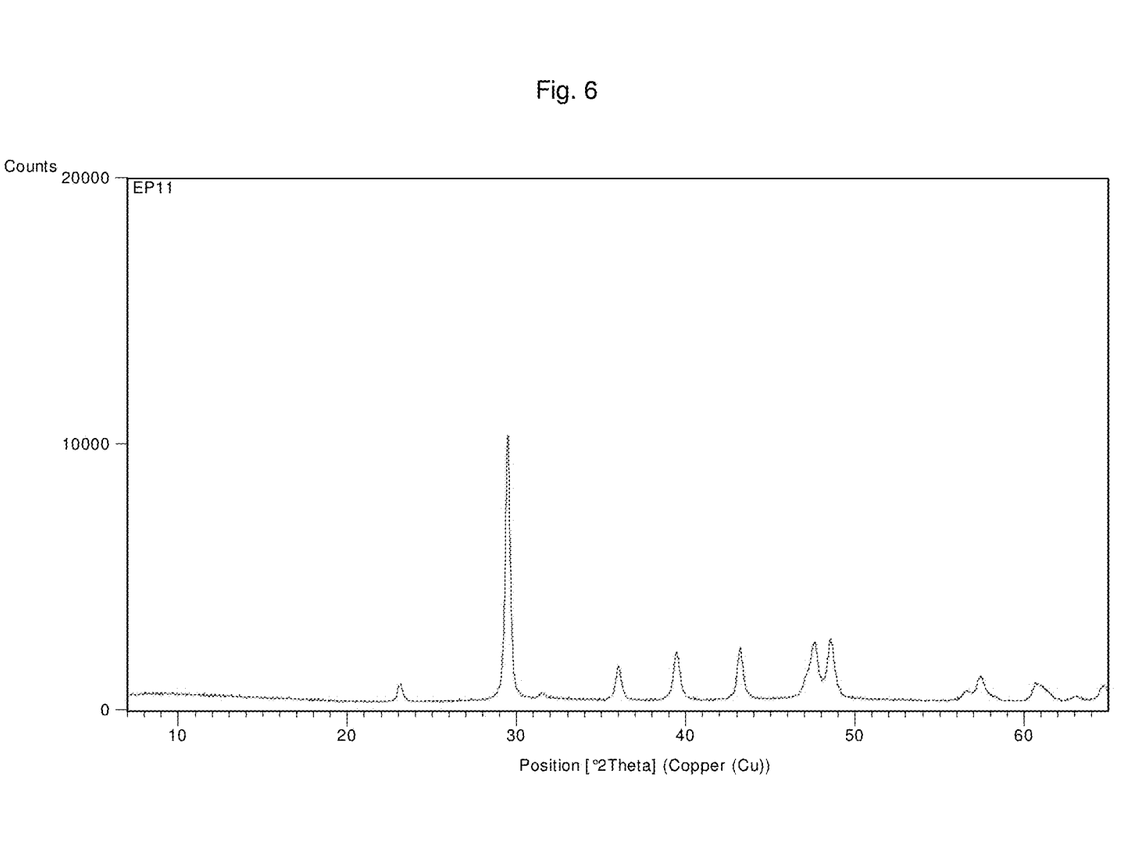
FIG. 6 shows the X-ray diffraction spectrum of the product of Comparison Example 3. The calcium carbonate particles comprised essentially crystalline fractions.

FIG. 6 shows the X-ray diffraction spectrum of this product. The calcium carbonate particles comprised essentially crystalline fractions.

When the calcium carbonate particles were aged in the mother liquor, the components were observed to be mainly crystalline after just 100 minutes.

Example 1

Dried, Stabilized ACC 5 l deionized water was prepared in a 10 l plastic canister, and 29.404 g (0.04 mol/l relating to solution A) calcium chloride dihydrate and 20.418 g (0.04 mol/l relating to solution A) propylene carbonate were dissolved in the water at 23.5° C. (solution A). A solution of 16.000 g (0.08 mol/l relating to solution B) sodium hydroxide in 5 l deionized water was prepared in a separate 5 l plastic canister at 23.5° C. (solution B).

Solution B was added rapidly to solution A, the stopwatch was started, the reaction mixture was shaken 20 times (approx. 10 s). With the pH value at 11.0 after exactly 14.75 min, the reaction was terminated by adding 1.7 g ethylene diamine-tetra-(methylenephosphonic acid) (pentasodium salt; 31% solution) and stirring vigorously for 1 min.

The precipitate was separated from the mother liquor by filtration, washed with deionized water and dried in the circulating air drying chamber, first at 130° C. for 45 min (BET: 4.4 $m^2$/g; product with structural water) and then overnight at 200° C. According to TGA (temperature range from 40-250°

C.), the water content after this drying step at 200° C. was about 0.1% by weight ("product contains no structural water").

The specific surface area of the particles dried at 200° C. was 3.9 m²/g and the pH value of the powder was 10.3.

After drying at 130° C. about 15.3 g reaction product was recovered (product containing structural water).

Figure 7:
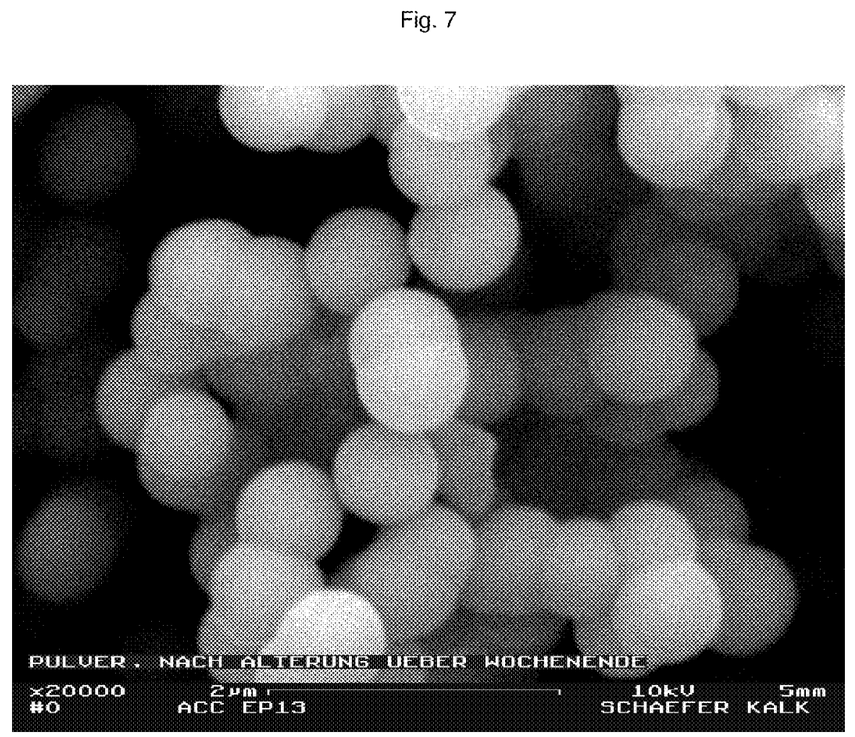
FIG. 7 shows an electron microscope image of the product of Example 1 after storing at 23° C. and in relative humidity of 65% for six days (product containing structural water).

An electron microscope image of the product taken after storing at 23° C. and in relative humidity of 65% for 6 days is shown in FIG. 7 (product containing structural water).

Figure 8:
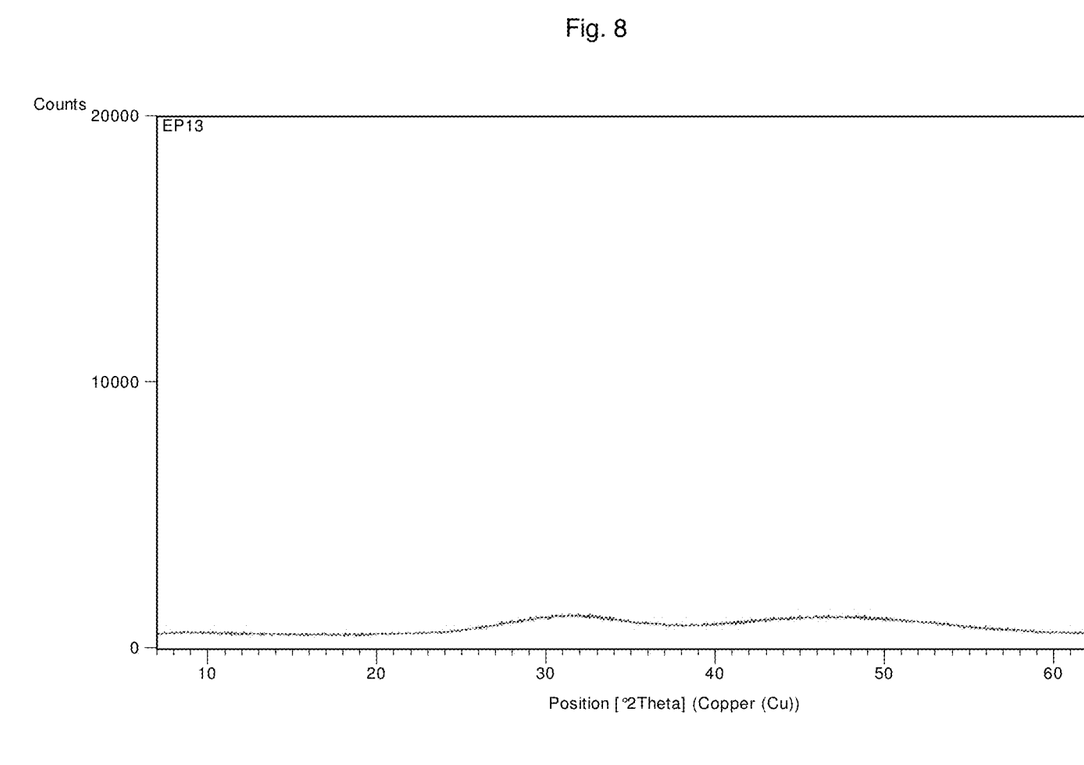
FIG. 8 shows the X-ray diffraction spectrum of the product of Example 1 that was dried at 200° C. ("product contains no structural water"). The calcium carbonate particles comprised exclusively amorphous fractions.

FIG. 8 shows the X-ray diffraction spectrum of the product that was dried at 200° C. ("product contains no structural water"). The calcium carbonate particles comprised exclusively amorphous fractions.

When the calcium carbonate particles were aged in the mother liquor, no crystalline components were observed even after 5 days.

Example 2

Dried, Stabilized ACC

The experiment was conducted as in example 1, although the stabilizing agent (ethylenediamine-tetra-(methylene-phosphonic acid) (pentasodium salt)) was added earlier (added after 5.5 min; pH value of the reaction mixture at the time of addition: 11.78).

After drying at 130° C., about 15.5 g reaction product was recovered (product containing structural water), which had a BET surface area of 14.6 m²/g.

Example 3

Dried, Stabilized ACC

The experiment was conducted as in example 1, although the stabilizing agent (ethylenediamine-tetra-(methylene-phosphonic acid) (pentasodium salt)) was added later (added after 30 min; pH value of the reaction mixture at the time of addition: 9.63).

After drying at 130° C., about 15.3 g reaction product was recovered (product containing structural water), which had a BET surface area of 4.4 m²/g and a contained a small fraction of crystalline components.

The invention claimed is:

1. Stabilized spherical, amorphous calcium carbonate particles with an average particle diameter in the range from 0.05 μm to 2.0 μm and a water content of not more than 5.0% by weight relative to the total weight of the particles and measured as residual moisture at 200° C., wherein:
the calcium carbonate particles contain at least one substance located at the surface of the calcium carbonate particles, the substance having a molar mass greater than 100 g/mol and a formula R—$X_n$, wherein the radical R stands for a radical having at least one carbon atom, radical X stands for a group having at least one oxygen atom and at least one carbon atom, sulphur atom, phosphorus atom and/or nitrogen atom, and n represents a number in the range from 1 to 20,
a fraction of crystalline calcium carbonate is less than 30% by weight, relative to the total weight of the calcium carbonate, and
a specific surface area of the calcium carbonate particles is not more than 14 m²/g.

2. The calcium carbonate particles according to claim 1, wherein the radical R stands for an aliphatic or cycloaliphatic radical, which may or may not contain additional radicals X, and which may or may not include one or more ether compounds.

3. The calcium carbonate particles according to claim 1, wherein the radical X stands for a group selected from the group consisting of
Carboxylic acid group ~COOH,
Carboxylate group ~COO⁻,
Sulphonic acid group ~$SO_3H$,
Sulphonate group ~$SO_3^-$,
Bisulphate group ~$OSO_3H$,
Sulphate group ~$OSO_3^-$,
Phosphonic acid group ~$PO_3H_2$,
Phosphonate group ~$PO_3H^-$, ~$PO_3^{2-}$,
Amino group ~$NR^1R^2$ and
Ammonium group ~$N^+R^1R^2R^3$,
wherein one of the radicals $R^1$, $R^2$, and $R^3$ can be a radical R and otherwise the radicals $R^1$, $R^2$, and $R^3$ can stand independently of each other for hydrogen or an alkyl group having 1 to 5 carbon atoms.

4. The calcium carbonate particles according to claim 3, wherein the radical X stands for a carboxylic acid group, carboxylate group, phosphonic acid group, or a phosphonate group.

5. The calcium carbonate particles according to claim 1, wherein the substance is selected from the group consisting of alkyl carboxylic acids, alkylcarboxylates, alkylsulphonic acids, alkyl sulphonates, alkylsulphates, alkylether sulphates, fatty alcohol ethoxylates, alkylphenol ethoxylates, substituted or unsubstituted alkylphosphonic acids, substituted or unsubstituted alkylphosphonates, sorbitan fatty acid esters, alkylpolyglucosides, N-methylglucamides, homo- and copolymers of acrylic acid, and the corresponding salt forms and block copolymers thereof.

6. The calcium carbonate particles according to claim 5, wherein the substance is selected from the group consisting of amino-tri-(methylene phosphonic acid), 1-hydroxyethylene-(1,1-diphosphonic acid), ethylenediamino-tetra-(methylene phosphonic acid), hexamethylene diamino-tetra-(methylene phosphonic acid), diethylenetriamino-penta-(methylene phosphonic acid), and alkylphosphonates thereof.

7. The calcium carbonate particles according to claim 5, wherein the substance is selected from homopolymers of acrylic acid and the corresponding salt forms thereof, which have a weight average molecular weight in the range from 1,000 g/mol-10,000 g/mol.

8. The calcium carbonate particles according to claim 5, wherein the substance is polyethylene oxide or polypropylene oxide.

9. The calcium carbonate particles according to claim 1, wherein the substance is present in a quantity in a range from 0.1% by weight to 5.0% by weight, relative to the $CaCO_3$ content of the spherical calcium carbonate particles.

10. A process for producing calcium carbonate particles according to claim 1, comprising reacting $Ca^{2+}$ ions in aqueous solution with dialkyl carbonate and/or alkylene carbonate in the presence of OH⁻ ions, wherein $Ca(OH)_2$ is not used as an OH⁻ source, and said $Ca^{2+}$, dialkyl carbonate and/or alkylene carbonate, and OH⁻, respectively, are used in the following concentrations:
a) $Ca^{2+}$: >10 mmol/l to 50 mmol/l;
b) Dialkyl carbonate and/or alkylene carbonate: >10 mmol/l to 50 mmol/l;
c) OH⁻: 20 mmol/l to 100 mmol/l,
wherein at least one substance is added to the reaction mixture that has a molar mass greater than 100 g/mol and has a formula R—$X_n$, wherein the radical R stands for a radical that contains at least one carbon atom, radical X stands for a group that includes at least one oxygen atom and at least one carbon atom, sulphur atom, phosphorus atom and/or nitrogen atom, and n represents a number in the range from 1 to 20, wherein the substance is added after the reaction has begun.

11. The process for producing calcium carbonate particles according to claim 1, comprising reacting $Ca(OH)_2$ in aqueous solution with dialkyl carbonate and/or alkylene carbonate in the presence of $OH^-$ ions, wherein said $Ca(OH)_2$, dialkyl carbonate and/or alkylene carbonate are used in the following concentrations:
a) $Ca(OH)_2$: >5 mmol/l to 25 mmol/l;
b) Dialkyl carbonate and/or
alkylene carbonate: >5 mmol/l to 25 mmol/l,
wherein at least one substance is added to the reaction mixture that has a molar mass greater than 100 g/mol and has the formula $R—X_n$, wherein the radical R stands for a radical that contains at least one carbon atom, radical X stands for a group that includes at least one oxygen atom and at least one carbon atom, sulphur atom, phosphorus atom and/or nitrogen atom, and n represents a number in the range from 1 to 20, wherein the substance is added after the reaction has begun.

12. The process according to claim 10, wherein the substance is added when the reaction mixture has a pH value in the range from 11.5 to 10.0, measured at the reaction temperature.

13. The process according to claim 10, wherein propylene carbonate is used as the alkylene carbonate and sodium hydroxide and/or calcium hydroxide is used as the $OH^-$ source.

14. A polymer compound containing spherical amorphous calcium carbonate particles according to claim 1.

15. The calcium carbonate particles according to claim 1, wherein n is a whole number.

16. The process according to claim 10, wherein n is a whole number.

17. The process according to claim 11, wherein n is a whole number.

18. The process according to claim 11, wherein the substance is added when the reaction mixture has a pH value in the range from 11.5 to 10.0, measured at the reaction temperature.

19. The process according to claim 11, wherein propylene carbonate is used as the alkylene carbonate.

\* \* \* \* \*